Patented June 10, 1941

2,245,249

UNITED STATES PATENT OFFICE 2,245,249

CYCLAMMONIUM QUATERNARY SALTS

Leslie G. S. Brooker, Rochester, N. Y., assignor to Eastman Kodak Company, Rochester, N. Y., a corporation of New Jersey No Drawing. Application October 21, 1938, Serial No. 236,297

15 Claims. (Cl. 260—240)

This invention relates to cyclammonium quaternary salts and to a process for the preparation thereof.

In the preparation of cyclammonium quaternary salts, particularly such complex cyclammonium quaternary salts as cyanine salts (also referred to as cyanine dyes), it is often advantageous to prepare them as the iodides, owing to the lesser solubility of the quaternary iodides. The lesser solubility of the iodides usually permits them to be readily isolated from their reaction mixtures. Frequently, however, it is necessary to prepare cyclammonium quaternary salts in a form which is very soluble in the reaction mixture. Separation of the quaternary salt from its reaction mixture in such cases is usually difficult. For this reason the more soluble quaternary salt is sometimes converted into a less soluble form by treating the reaction mixture with alkali metal iodides or perchlorates, for example. Quaternary iodides or perchlorates are formed, and owing to their lesser solubility, are ordinarily readily separated from the reaction mixture.

This lesser solubility of certain cyclammonium quaternary salts, which is often so useful in isolating the salts from their reaction mixtures, is frequently undesirable when using the salts for certain purposes. For example, when incorporating cyclammonium quaternary salts, such as cyanine salts, in photographic emulsions, the cyanine salt is first dissolved in a solvent, such as methyl alcohol or acetone, and the resulting solution is added to the emulsions. It is apparent that unless the salt is sufficiently soluble in the methyl alcohol or acetone, difficulties will be encountered.

Inasmuch as cyanine salts are frequently obtained as the iodides and inasmuch as the iodides are frequently of low solubility, it is not uncommon to convert the cyanine iodides to a more soluble form before using. Very often this conversion takes the form of a change of a cyanine iodide to a cyanine bromide, or more frequently, to a cyanine chloride.

A method for converting cyanine iodides to cyanine chlorides is known and has been used for some time. According to this known method, the cyanine iodide is suspended in methyl alcohol and the methyl alcoholic suspension is treated with an excess of freshly prepared silver chloride. The resulting mixture is refluxed several hours. During this time, the chloride anion of the silver chloride takes the place of the iodide anion of the cyanine iodide and the iodide anion of the cyanine iodide takes the place of the chloride anion of the silver chloride. The resulting silver iodide is filtered off and the resulting methyl alcoholic solution of cyanine chloride is concentrated and chilled to precipitate the cyanine chloride. This method while it has been used for some time is not entirely satisfactory, because the yield of more soluble salt attained by the process is frequently very low.

I have now found that the yield of more soluble salt attained by such processes can be greatly improved by effecting the process in a phenol and/or a primary aromatic amine, instead of in an alcohol.

Accordingly it is an object of my invention to provide an improved process for the preparation of cyclammonium quaternary salts, whereby a cyclammonium quaternary salt of lesser solubility can be converted into one of greater solubility. A further object is to provide an improved process for the preparation of dyes. A still further object is to provide new cyclammonium quaternary salts. Other objects will become apparent hereinafter.

According to my invention, I treat a cyclammonium quaternary salt, in the presence of a phenol and/or a primary aromatic amine, with a silver salt whose anion interchanges with the anion of the cyclammonium salt, during the treatment, to give a second silver salt whose solubility in the phenol and/or aromatic amine employed is less than that of the first silver salt.

As phenols and primary aromatic amines, I have found that those of the benzene and naphthalene series are advantageously employed, and that those of the benzene series are superior to those of the naphthalene series. I have found it advantageous to employ phenols and/or primary aromatic amines of low molecular weight, such as are liquid at ordinary temperatures or at a temperature of not more than about 50° C. However, phenols and/or primary aromatic amines which are liquid at temperatures over 50° C. can be employed, although phenols and/or primary aromatic amines which melt only above about 100° C. are ordinarily of small utility in practicing my invention. The phenols and/or primary aromatic amines preferably should permit the cyanine salt to separate therefrom at least upon cooling, but before solidification. I have found that phenols are much superior to primary aromatic amines in practicing my invention.

The quantity of primary aromatic amine and/or phenol employed is advantageously sufficient to give a solution of the quaternary salt employed as starting material, at the temperature of the treatment. Heat accelerates my process.

The following are typical phenols which I employ in my invention:

> Phenol
> Cresols
> Xylenols
> Thymol
> Ethylphenols
> Chlorophenols
> α- and β-naphthol The cresols are advantageously employed in practicing my invention.

The following are typical primary aromatic amines which I employ in my invention:

> Aniline
> Toluidines
> Xylidines
> α- and β-naphthylamine

An excess of the starting silver salt is advantageously employed. Excesses of from 50 to 200 percent, i. e. from 1.5 to 3 molecular proportions of silver salt for each mole of quaternary salt, are advantageously employed.

While the process of my invention is subject to variation, particularly with respect to the nature and quantity of the quaternary salt employed, the nature and quantity of the silver salt employed, the nature and quantity of the primary aromatic amines and phenols employed, the temperatures employed, and the order of steps employed in the process, the following examples will serve to illustrate the manner of practicing my invention.

EXAMPLE 1.—2,2'-diethyl-3,4,3',4'-dibenzothiacyanine chloride 100 g. (1 mol.) of 2,2'-diethyl-3,4,3',4'-dibenzothiacyanine iodide were placed in a two-liter flask equipped with a mechanical stirrer. 500 cc. of a commercial grade of cresols containing m- and p-cresols were added to the flask and the resulting mixture was heated to the temperature of a steam bath. 38 g. (1 mol.+50% excess) of freshly prepared silver chloride were added to the mixture while stirring. Heating at the temperature of the steam bath and stirring were continued for about 45 minutes. The mixture was then filtered without cooling. The residue on the filter was washed with a small amount (for example two portions of 15 cc. each) of methyl alcohol. The combined filtrate and washings were diluted with about 1000 cc. of diethyl ether to precipitate the cyanine chloride. The cyanine chloride was filtered off, washed well with acetone and dried. The yield was 80 g. or 96%.

In a similar manner, 2,2'-diethyl-3,4,3',4'-dibenzothiacyanine acetate can be prepared by employing 44 g. of silver acetate instead of 38 g. of silver chloride.

EXAMPLE 2.—2,2'-diethyl-5,6,5',6'-dibenzothiacyanine chloride 110.5 g. (1 mol.) of 2,2'-diethyl-5,6,5',6'-dibenzothiacyanine iodide were placed in a 2-liter flask equipped with a mechanical stirrer. 500 cc. of a commercial grade of cresol containing m- and p-cresols were added and the mixture was heated to the temperature of a steam bath. 41.8 g. (1 mol.+50% excess) of freshly prepared silver chloride were added to the mixture, while stirring. Heating at the temperature of the steam bath and stirring were continued for 45 minutes. The mixture was then filtered without cooling. The residue on the filter was washed with a small amount of methyl alcohol. The combined filtrate and washings were then diluted with about 1000 cc. of diethyl ether to precipitate the cyanine chloride. The cyanine chloride was filtered off, washed with successive portions of diethyl ether and acetone and then dried. After recrystallization from methyl alcohol, 54 g. (a yield of 65%) of cyanine chloride was obtained. In a similar manner 2,2'-diethylselenacyanine iodide can be converted to the chloride.

EXAMPLE 3.—1',2-diethyl-3,4-benzothia-2'-cyanine chloride 5 g. (1 mol.) of 1',2-diethyl-3,4-benzothia-2'-cyanine iodide were suspended in 35 g. of thymol. The mixture was heated to the temperature of a steam bath, 2.9 g. (1 mol.+100% excess) of freshly prepared silver chloride were added, while stirring. The resulting mixture was stirred and heated at the temperature of the steam bath for about 30 minutes. The mixture was then filtered without cooling. The residue on the filter was washed with a small amount of methyl alcohol. The combined filtrate and washings were chilled and diluted with about 200 cc. of diethyl ether to precipitate the cyanine chloride. The cyanine chloride was filtered off, washed with acetone and dried. After recrystallization from methyl alcohol, 2.5 g. (a yield of 62%) of the cyanine chloride was obtained. Using 45 cc. of o-chlorophenol instead of 35 g. of thymol and heating at the temperature of a steam bath for one hour, a yield of recrystallized cyanine chloride of 82% was obtained. Using 50 cc. of phenol and heating for one hour at the temperature of a steam bath, a yield of cyanine chloride (recrystallized) of 93% was obtained. Using 30 cc. of 4-hydroxy-1,3-dimethylbenzene and heating at the temperature of a steam bath for thirty minutes, a yield of recrystallized cyanine chloride of 62% was obtained.

EXAMPLE 4.—1,1'-diethyl-2,2'-cyanine chloride 10 g. (1 mol.) of 1,1'-diethyl-2,2'-cyanine iodide were dissolved in 50 cc. of a commercial grade of cresol containing m- and p-cresols. The solution was heated to the temperature of a steam bath. 6.2 g. (1 mol.+100% excess) of freshly prepared silver chloride were added to the solution, while stirring. Heating at the temperature of the steam bath and stirring were continued for about 45 minutes. The mixture was then filtered without cooling. The residue on the filter was washed with a small amount of methyl alcohol. The combined filtrate and washings were chilled and diluted with about 200 cc. of diethyl ether to precipitate the cyanine chloride. The cyanine chloride was filtered off, washed with diethyl ether and dried. After recrystallization from methyl alcohol, 5.4 g. (a yield of 68%) of the cyanine chloride was obtained.

EXAMPLE 5.—2,2'-diethyl-3,4,3',4'-dibenzothiacyanine chloride 40 g. (1 mol.) of 2,2'-diethyl-3,4,3',4'-dibenzothiacyanine iodide were suspended in 800 cc. of aniline and the mixture was heated to the temperature of a steam bath. 30.4 g. (1 mol.+200% excess) of freshly prepared silver chloride were added to the mixture, while stirring. Heating at the temperature of the steam bath and stirring were continued for about 3.5 hours. The mixture was then filtered without cooling. The residue on the filter was extracted well with hot methyl alcohol. The filtrate and extract were chilled and then treated with about 1.5 liters of diethyl ether to precipitate the cyanine chloride. The cyanine chloride was filtered off, washed with diethyl ether and then acetone and finally dried. After recrystallization from methyl alcohol, a yield of 43% of cyanine chloride was obtained.

EXAMPLE 6.—2,2',8-trimethyl-5,6,5',6'-dibenzothiacarbocyanine chloride 2.9 g. (1 mol.) of 2,2',8-trimethyl-5,6,5',6'-dibenzothiacarbocyanine iodide were dissolved in 50 cc. of a commercial grade of cresol. The solution was heated to the temperature of a steam bath. 1.4 g. (1 mol.+100% excess) of freshly prepared silver chloride were added to the solution, while stirring. Heating at the temperature of the steam bath and stirring were continued for about 30 minutes. The reaction mixture was then filtered without cooling. The residue on the filter was washed with a small amount of methyl alcohol. The combined filtrate and washings were chilled and diluted with 200 cc. of diethyl ether to precipitate the cyanine chloride. The cyanine chloride was filtered off, washed with acetone and dried. After recrystallization from methyl alcohol, 1.3 g. (a yield of 53%) of the cyanine chloride was obtained.

EXAMPLE 7.—2,2'-di-(β-hydroxyethyl)-thiacarbocyanine chloride 4.1 g. (1 mol.) of 2,2'-di-(β-hydroxyethyl)-thiacarbocyanine bromide was placed in a 1-liter flask with 50 cc. of a commercial grade of cresol containing m- and p-cresols. The mixture was heated to the temperature of a steam bath. 2.5 g. (1 mol.+100% excess) of freshly prepared silver chloride were added, while stirring. Heating at the temperature of the steam bath and stirring were continued for about 30 minutes. The reaction mixture was then filtered without cooling. The residue on the filter was washed with a small amount of methyl alcohol. The combined filtrate and washings were chilled and then diluted with about 200 cc. of diethyl ether to precipitate the cyanine chloride. The cyanine chloride was filtered off, washed with diethyl ether and dried. After recrystallization from methyl alcohol, 2.3 g. (a yield of 62%) of the cyanine chloride was obtained.

EXAMPLE 8.—1-methylbenzothiazole methochloride 5.8 g. (1 mol.) of 1-methylbenzothiazole methiodide was dissolved in 50 cc. of a commercial grade of cresol containing m- and p-cresols. The solution was heated to the temperature of a steam bath. 5.7 g. (1 mol.+100% excess) of freshly prepared silver chloride were added, while stirring. Heating at the temperature of the steam bath and stirring were continued for about 30 minutes. The reaction mixture was then filtered without cooling. The residue on the filter was washed with a small amount of methyl alcohol. The combined filtrate and washings were chilled and then diluted with about 500 cc. of diethyl ether to precipitate the quaternary chloride. The quaternary chloride was filtered off and dried. 3.6 g. (a yield of 90%) of the quaternary chloride was obtained.

EXAMPLE 9.—1-methyl-α-naphthothiazole chloride 7 g. (1 mol.) of 1-methyl-α-naphthothiazole ethiodide were dissolved in 50 cc. of a commercial grade of cresol containing m- and p-cresols by heating at the temperature of a steam bath. 5.7 g. (1 mol.+100% excess) of freshly prepared silver chloride were added, while stirring. Heating at the temperature of the steam bath and stirring were continued for about 30 minutes. The reaction mixture was then filtered without cooling. The residue on the filter was washed with a small amount of methyl alcohol. The combined filtrate and washings were chilled and then diluted with about 500 cc. of diethyl ether to precipitate the quaternary chloride. The quaternary chloride was filtered off, washed with diethyl ether and dried. 5.1 g. (a yield of 98%) of the quaternary chloride was obtained.

The silver chloride and silver acetate used in the above examples are advantageously prepared just prior to use by adding a water-soluble chloride or acetate, e. g. sodium chloride or acetate, to an aqueous solution of silver nitrate. The silver salt which precipitates is filtered off and washed with cool water to remove any unreacted water-soluble salts.

The foregoing examples have been presented with the thought of providing the art with the most practical information. Thus the conversion of a number of cyclammonium quaternary salts of low solubility in solvents, such as methyl alcohol for example, to cyclammonium quaternary salts of greater solubility has been illustrated. Of course, my process is equally applicable to cyclammonium quaternary salts which already possess a fair solubility, since by my process such salts are converted into even more soluble forms. Thus by my process, 2,2'-diethyloxacarbocyanine iodide can be converted into 2,2'-diethyloxacarbocyanine chloride. Still further examples and illustrations of my process could be provided, but the several foregoing examples and illustrations will teach those skilled in the art the manner of practicing my invention.

The cyanine salt described in Example 1 and having the formula:

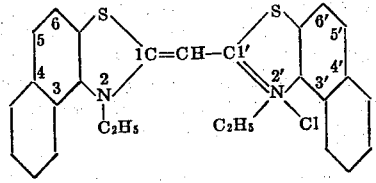

is a new and useful substance, sensitizing gelatino-silver-chloride emulsions strongly to the blue region of the spectrum.

I have further found that impurities can advantageously be extracted from relatively insoluble dyes by means of phenols and/or primary aromatic amines. Thus 2,2'-diethyl-3,4,3',4'-dibenzothiacyanine iodide and 5-(2-ethyl-β-naphthothiazylidene-ethylidene)-3-phenylrhodanine for example can be purified by dissolving them in hot phenol or hot m-cresol for example and allowing the hot solution to cool, when the purified dye separates out leaving at least a part of the impurities in solution.

What I claim as my invention and desire to be secured by Letters Patent of the United States is:

1. In a process for preparing a cyclammonium quaternary salt which comprises reacting, in a reaction medium, a cyclammonium quaternary salt with a silver salt whose anion interchanges with the anion of the quaternary salt to give a second silver salt of lesser solubility in the reaction medium employed than the first silver salt, the step which comprises employing as the reaction medium, a phenol of the benzene series.

2. In a process for preparing a cyclammonium quaternary salt which comprises reacting, in a reaction medium, a cyanine salt with a silver salt whose anion interchanges with the anion of the cyanine salt to give a second silver salt of lesser solubility in the reaction medium employed than the first silver salt, the step which comprises employing, as a reaction medium, a phenol of the benzene series.

3. In a process for preparing a cyclammonium quaternary salt which comprises reacting, in a reaction medium, a cyanine salt with a silver salt whose anion interchanges with the anion of the cyanine salt to give a second silver salt of lesser solubility in the reaction medium employed than the first silver salt, the step which comprises employing, as the reaction medium, a cresol.

4. In a process for preparing a cyclammonium quaternary salt which comprises reacting, in a reaction medium, silver chloride with a cyclammonium quaternary halide in which the halide ion has a molecular weight greater than that of a chloride ion, the step which comprises employing, as the reaction medium, a phenol of the benzene series.

5. In a process for preparing a cyclammonium quaternary salt which comprises reacting, in a reaction medium, silver chloride with a cyanine halide in which the halide ion has a molecular weight greater than that of a chloride ion, the step which comprises employing, as the reaction medium, a phenol of the benzene series.

6. In a process for preparing a cyclammonium quaternary salt which comprises reacting, in a reaction medium, silver chloride with a cyanine halide in which the halide ion has a molecular weight greater than that of a chloride ion, the step which comprises employing, as the reaction medium, a phenol of the benzene series.

7. In a process for preparing a 2,2'-dialkyl-3,4,3',4'-dibenzothiacyanine chloride which comprises reacting, in a reaction medium, silver chloride with a 2,2'-dialkyl-3,4,3',4'-dibenzothiacyanine iodide, the step which comprises employing, as the reaction medium, a phenol of the benzene series.

8. In a process for preparing 2,2'-diethyl-3,4,3',4'-dibenzothiacyanine chloride which comprises reacting, in a reaction medium, silver chloride with 2,2'-diethyl-3,4,3',4'-dibenzothiacyanine iodide, the step which comprises employing, as the reaction medium, a phenol of the benzene series.

9. In a process for preparing 2,2'-diethyl-3,4,3',4'-dibenzothiacyanine chloride which comprises reacting, in a reaction medium, silver chloride with 2,2'-diethyl-3,4,3',4'-dibenzothiacyanine iodide, the step which comprises employing, as the reaction medium, a cresol.

10. In a process for preparing 2,2-diethyl-3,4,3',4'-dibenzothiacarbocyanine chloride which comprises reacting, in a reaction medium, silver chloride with 2,2'-diethyl-3,4,3',4'-dibenzothiacarbocyanine iodide, the step which comprises employing as the reaction medium a cresol.

11. In a process for preparing 1-methyl-α-naphthothiazole etho-chloride which comprises reacting, in a reaction medium, silver chloride with a 1-methyl-α-naphthothiazole etho-iodide, the step which comprises employing, as the reaction medium, a cresol.

12. In a process for preparing a cyclammonium quaternary salt which comprises reacting, in a reaction medium, about one molecular proportion of a cyclammonium quaternary halide in which the halide ion has a molecular weight greater than that of a chloride ion, with from about one and one-half to about three molecular proportions of silver chloride, the step which comprises employing, as the reaction medium, a phenol of the benzene series.

13. In a process for preparing a cyclammonium quaternary salt which comprises reacting, in a reaction medium, about one molecular proportion a cyclammonium quaternary halide in which the halide ion has a molecular weight greater than that of a chloride ion, with from about one and one-half to about three molecular proportions of silver chloride, the step which comprises employing, as the reaction medium, a cresol.

14. In a process for preparing a cyclammonium quaternary salt which comprises reacting in a reaction medium, a cyclammonium quaternary salt with a silver salt whose anion interchanges with the anion of the quaternary salt to give a second silver salt of lesser solubility in the reaction medium than the first silver salt, the step which comprises employing as the reaction medium, a phenol having a melting point of not more than 100° C.

15. In a process for preparing a cyclammonium quaternary salt which comprises reacting in a reaction medium, a cyclammonium quaternary salt with a silver salt whose anion interchanges with the anion of the quaternary salt to give a second silver salt of lesser solubility in the reaction medium than the first silver salt, the step which comprises employing as the reaction medium, a phenol having a melting point of not more than 50° C.

LESLIE G. S. BROOKER.